Nov. 19, 1957             O. VIELI             2,813,780
MACHINE FOR THE FABRICATION OF HARDENABLE FOAMY PLASTIC
Filed March 10, 1954             2 Sheets-Sheet 1
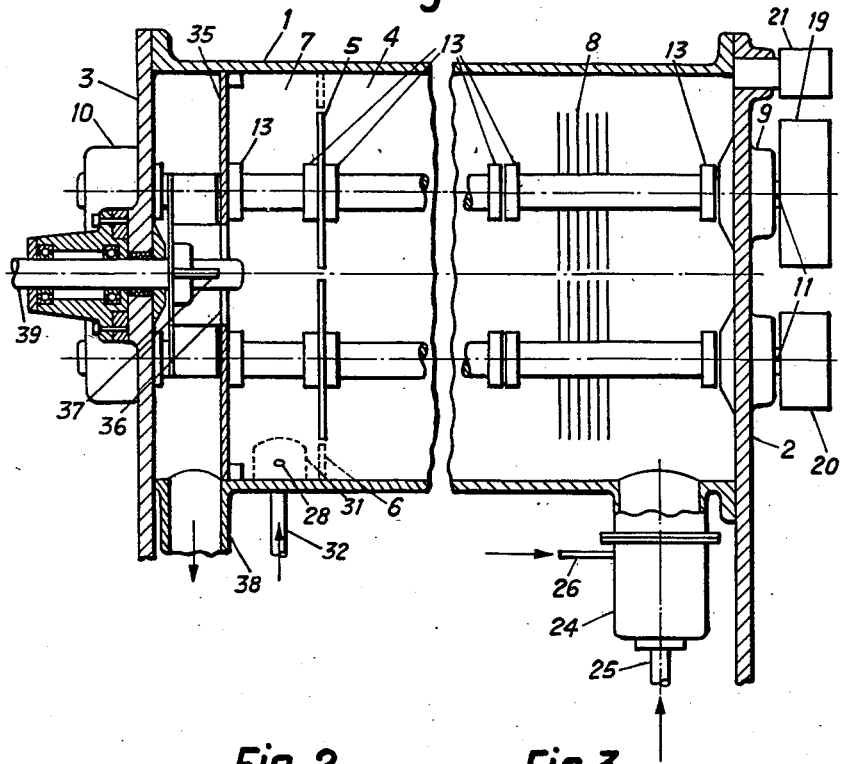
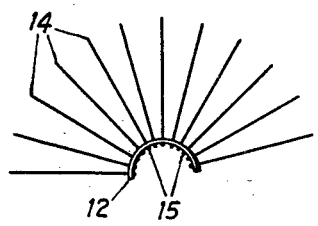
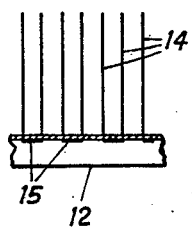
INVENTOR:
Otto Vieli
BY
ATTORNEYS Nov. 19, 1957        O. VIELI        2,813,780

MACHINE FOR THE FABRICATION OF HARDENABLE FOAMY PLASTIC

Filed March 10, 1954        2 Sheets-Sheet 2

INVENTOR:
Otto Vieli
BY
Richard y Geier
ATTORNEYS

United States Patent Office 2,813,780
Patented Nov. 19, 1957

2,813,780
MACHINE FOR THE FABRICATION OF HARDENABLE FOAMY PLASTIC

Otto Vieli, Rhazuns, Graubunden, Switzerland, assignor to Spumalit-Anstalt, Vaduz, Liechtenstein, a company of Liechtenstein Application March 10, 1954, Serial No. 415,410

Claims priority, application Switzerland March 12, 1953

9 Claims. (Cl. 23—286)

The present invention relates to an apparatus for the continuous fabrication of hardenable foamy plastic and is characterized by a pneumatic coarse foam producer and a power-driven horizontal agitator unit. The pneumatic coarse foam producer arranged directly adjacent to the agitator unit consists of a horizontal fine-mesh sieve through which compressed air is forced from underneath while a thin layer of foam forming material with a catalytic action is maintained on the upper surface of the said sieve by appropriately controlled feed. The flow of compressed air produces coarse foam which is transferred into the agitator unit where the separating action of a plurality of horizontally disposed, elongated wire bristle rollers driven at similar or different speeds convert the coarse foam into a homogeneous fine foam possessing catalytic properties while the said foam traverses the agitator unit in the axial direction. Subsequently the fine foam reaches the rear portion of the elongated agitator unit while it is still under the action of the rotating wire bristle rollers where an adequate amount of a liquid polycondensable synthetic resin is continuously added. This synthetic resin mixes with the fine foam so that under the action of the catalytic properties of the foam polycondensation sets in immediately and throughout its volume. This produces a hardening foamy plastic of fine structure remaining under the action of the rotating wire bristle rollers for a predetermined period until it has traversed the chamber in the axial direction and is engaged by a delivery unit removing the foamy plastic from the agitator unit while it is not yet fully set.

A large number of different agitator designs and foam producers suitable for the fabrication of foamy plastics are already known. It has been found, however, that it is not possible for the present purpose, i. e. the continuous production of hardenable foamy plastic, to arrange a foam maker and a suitable agitator unit of known construction in series. It is necessary carefully to balance the coarse foam producer, the separating action of the agitator unit, the feed rate, the plastic admixing unit and the delivery unit in order to obtain a homogeneous foamy plastic which is moldable and hardenable throughout and which will retain its fine structure after complete hardening.

A process has been suggested in which foam is produced in an agitator, transferred into a second agitator where plastic is added, if necessary together with filling materials and hardening agents, and the resulting foam continuously delivered, dried and hardened. In another process the production of foam and the addition of plastic is performed in a single agitator and the final product continuously removed from the agitator by means of compressed air.

These known processes for the continuous fabrication of hardenable foamy plastics thus first produce a foam which is subsequently mixed with hardenable synthetic resin and hardened, usually by heating. The finished product displays a number of disadvantages, in particular it is non-homogeneous in structure and chemically not neutral. Unlike the said processes, the machine according to the present invention operates with a foam-forming fluid containing a catalyst exercising a hardening action upon the synthetic resin added later, and by means of coarse and fine foam producers arranged in series produces a fine foam of which every individual lamella contains the necessary catalyst. By admixing a synthetic resin whose rapid polycondensation is caused by the catalytic property of the fine foam, it is possible to produce a hardening foamy plastic of fine structure which is continuously removed from the agitator unit by a foam pump.

The machine for the continuous fabrication of a hardenable foamy plastic in accordance with the present invention will be described in conjunction with Figs. 1 to 6, in which:

Fig. 1 is a side view of an embodiment of the present invention, partly in section, with unessential details omitted;

Figs. 2 and 3 are a diagrammatic cross-section and a longitudinal section respectively of one of the semicircular shells of a wire bristle roller as may be used in the machine according to Fig. 1;

Figure 4:
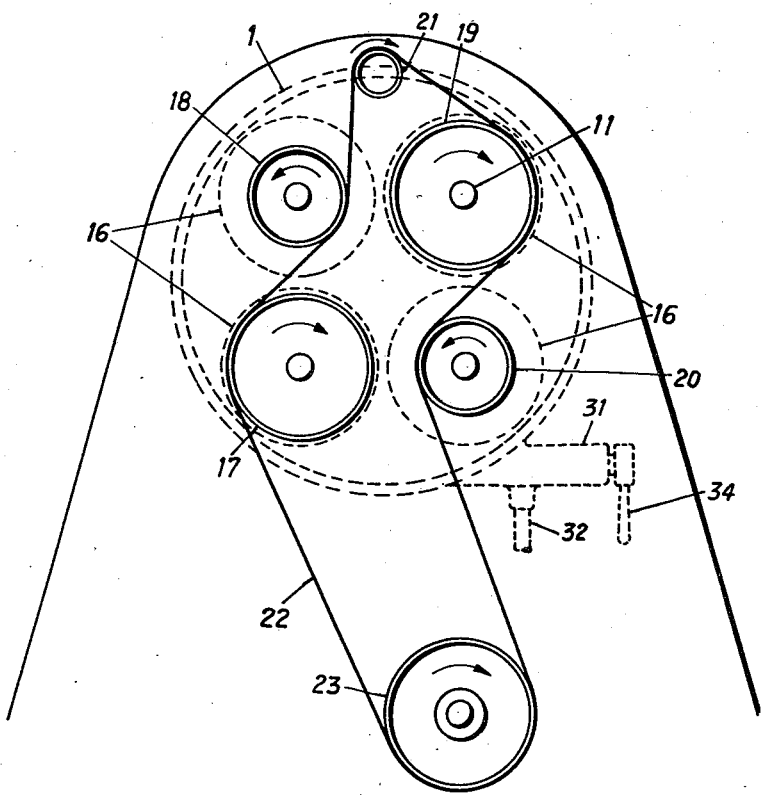
Fig. 4 is a front view of the embodiment according to Fig. 1 showing an embodiment of the driving means for the wire bristle rollers.

Fig. 1 is a diagrammatic view of an embodiment of the machine according to the present invention for the continuous fabrication of hardenable foamy plastic. The machine here consists of an elongated container 1 of circular cross section made of steel or another material resistant to the action of the materials employed. The front and rear ends of the drum-shaped container are closed by end walls 2 and 3 respectively to form a chamber 4. Four wire bristle rollers 8 whose construction will be disclosed below extend over the length of the chamber 4 in the container 1 and constitute the agitator members of the agitator unit according to the invention. The four wire bristle rollers are rotatably supported in the end walls 2 and 3 by bearings 9 and 10 and are each supported by a rotating shaft 11 extending from bearings 9 to bearings 10. As shown in Fig. 4, the four shafts 11 and their bearings 9 respectively are symmetrically disposed to form the corners of a square whose centre lies on the longitudinal axis of the drum-shaped container 1. The four wire bristle rollers 8 are of similar construction and dimensions. Attached to the unitary rotating shaft 11 of such a wire bristle roller is a tube split along two opposite disposed lines and forming two identical shells of semicircular section of which one is indicated at 12 in Figs. 2 and 3. Several pairs of such semicircular shells are provided on each of the four roller shafts 11, attachment being effected by means of clamp rings 13. Each of the total of sixteen longer and eight shorter semicircular shells 12 is provided with a plurality of bores along a number of shell lines, by way of example along twelve shell lines arranged at equal angular distances in Fig. 2, which bores are also arranged at equal distances in the axial direction. Inserted from the interior of the shell into two opposite bores of one shell line are the two elongated ends 14 of a prong-type length of wire the short connecting piece 15 of the two lengths engaging the interior of the shell and being attached thereto as by welding or screwing. As shown diagrammatically in Figs. 2 and 3, each of the semicircular shells forms one half of a wire bristle roller, two sections attached to the shaft 11 by means of clamp rings 13 forming one roller 8 equipped with uniformly disposed wire projections 14 on its circumference. The radial length of the wires 14 is such as to ensure that the four wire bristle rollers do not touch one another or the chamber wall while being arranged at the least possible distance therefrom as indicated by lines 16 showing the outermost periphery of the wire bristle rollers.

The disclosed construction of the wire bristle rollers forming the separating members in an agitator unit has proved to be very advantageous in operation, in particular because the semicircular shells with the wire bristles are easily interchanged. For the present purpose of continuous fabrication of hardenable foamy plastic of fine structure, wire bristle rollers of a tube diameter of approximately 150 mm. and a wire length of approximately 50 mm., a thickness of 1.2 to 1.5 mm., arranged at axial distances of 10 mm. and angular distance of 9 degrees have proved to be particularly suitable. Satisfactory results may be obtained with rollers having other dimensions.

The direction and speed of rotation of the wire bristle rollers are essential factors for the required action of the said rollers. In the present embodiment of the roller drive, the said drive is effected through pulleys 17, 18, 19 and 20 respectively as shown in Figs. 1 and 4, on being provided for each of the roller shafts 11. A common belt 22 runs over the said pulleys via a reversing pulley 21, and is driven by the pulley 23 in turn belonging to an electric drive unit. The belt engages the respective pulleys in such a manner as to cause rotation of the rollers in the directions indicated by arrows so that all wires rotate in the same direction in those sections of the interior of the chamber in which pairs of rollers are separated by a small distance only as indicated by the lines 16. In the horizontal gap between the wire bristle rollers driven by the pulleys 17 and 18 respectively the feed direction of the two rollers is, by way of example, from the outer wall of the container to the central axis of the said container while the feed direction of the rollers driven by the pulleys 19 and 20 respectively is directly opposed, that is towards the central axis of the container. Conversely, the feed direction in the gap between the two vertically disposed wire bristle rollers driven by pulleys 18 and 19, or 17 and 20 respectively, is towards the upper and lower exterior wall of the container from the central axis of the container.

Pairs of rollers are driven at identical speeds by means of pulleys 17 and 19 of large diameter and pulleys 18 and 20 of smaller diameter respectively, the arrangement being such that, viewed from the front (see Fig. 4) rollers following one another along the periphery of the container revolve at different speeds while those revolving at identical speeds are diametrically opposed. This is achieved by proving pulleys 17, 18, 19 and 20 arranged in sequence with different diameters so that a pulley of large diameter is followed by one of small diameter and vice versa.

The drive disclosed with the directions of revolution and pairwise identical speeds of the rollers is, of course, only one embodiment and the invention is not limited thereto. Alternatively a train of gears may be employed in known manner even though it does not allow such flexibility in respect of changes in the direction of revolution as a belt drive achieves. This is important because according to the type of materials employed and other operating conditions rollers following one another may be required to revolve in opposite directions while the speeds may have to be varied.

As will be seen from Fig. 1 the drum-shaped container is directly attached to a coarse foam producer 24 to which compressed air is fed through a pipe 25 and a fluid capable of forming foam is fed through duct 26. The coarse foam producer 24 is shown in diagrammatic form in Fig. 5 and consists of a horizontally disposed fine-mesh sieve 27 through which compressed air is forced from underneath while the foam forming fluid is fed through the duct 26 in quantities ensuring the continuous presence of a relatively thin layer of fluid on the upper surface of the sieve 27. The compressed air forced through the sieve 27 transforms this fluid layer into a coarse foam consisting of large bubbles in a quantity determined by the flow rate of the compressed air and the thickness of the fluid layer on the sieve 27.

Figure 5:
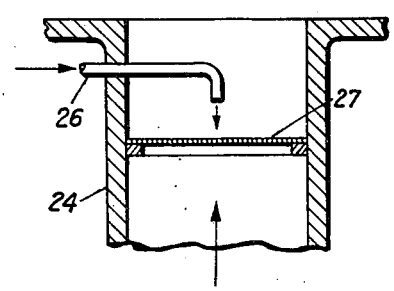
Fig. 5 is a longitudinal section of an embodiment of the coarse foam producer.

The coarse foam producer of which an embodiment is shown in Fig. 5 transfers the coarse foam produced directly into the front end of the chamber 4 of the container 1. The coarse foam is there subjected to the action of the rotating wire bristle rollers which convert it into fine foam of predetermined structure on its axial path through the container 1, in which form it reaches the rear portion of the chamber 4.

Figure 6:
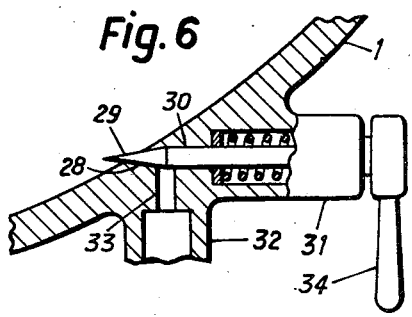
Fig. 6 is a diagrammatic section of an embodiment of the rapid action valve designed for use in the embodiment according to Fig. 1.

Similar wire bristle rollers are arranged on the same shafts 11 in this rear portion of chamber 4. Here the fine foam in continuous motion is mixed with a fluid synthetic resin injected into the chamber 6 in a tangential direction through opening 28. An embodiment of this injection unit is disclosed in Fig. 6. In inoperative position, opening 28 in the container wall 1 is closed by a valve-type cone 29 of a pin 30 forming part of a rapid action valve 31 actuated by spring action. The plastic material to be injected into the interior of container 1 is forced through pipe 32 and the valve bore 33 and can emerge through opening 28 when the valve pin 30 is retracted against the action of the spring by a swivelling movement of the lever 34. As the lever 34 returns, opening 28 will close immediately. This is important when there is a danger that the fine foam material might enter channel 33 and the duct 32, thus causing at least partial hardening of the synthetic resin and blocking the valve.

If the base materials are properly selected, the fine foam intimately mixed with the synthetic resin added in this section of the chamber 4, will form a homogeneous hardening foam of fine structure and after a certain period of continuous hardening without attaining its final hardness, reaches the rear wall 35 where it is engaged by a delivery unit, in the present case the impeller 37 of a foam pump, through the opening 36 and removed from the container 1 through the pipe 38. The impeller 37 of the pump is driven through shaft 39 by an adjustable motor. The rate of revolution of the said motor determines the rate of delivery of the foamy plastic within certain limits and accordingly the period during which it remains in the agitator unit after addition of the plastic material. According to type and quantity of the synthetic resin fed into the container, this period must be adjusted because it is essential that a continuation of the hardening process of the foamy plastic to a condition in which its structure might be altered by the rotating wire bristle rollers be avoided.

In operation it has proved advantageous to prevent synthetic resin or foamy plastic already mixed with the former from entering the front portion of the container 1 from the rear portion. This may be achieved by a circular disc 5 on each of the four rollers 8 arranged at a suitable point along their length. These discs will to some extent screen the rear portion of the chamber 4 from the front. A preferred ratio of the lengths of the rear and front sections is 1:3.5, but this value is not critical. If necessary, a transverse baffle plate 6 indicated by broken lines may be added to these rotating discs, which plate is arranged inside the container 1 and extends radially to the immediate neighborhood of the rotating discs forming a narrow gap therewith. Naturally the opening between the four rotating discs which is symmetrical to the container axis and serves as a passage for the foamy plastic from the front portion to the rear of the container 1 is retained. Finally there is the possibility of providing a rigid transverse wall with an opening in the middle or several suitably disposed openings in place of the discs and baffle plate.

The machine according to this specification and the enclosed Figs. 1-6 has proved suitable for the continuous fabrication of hardenable foamy plastic. In this connection it is important that the foam-forming fluid fed to the coarse foam producer and containing a catalyst be adapted to the plastic material added in chamber 7, that it be taken up by the said material in order to cause its polycondensation. Alcohol sulphonate with an acid catalyst has proved suitable as a foam-forming substance if an unstable carbamide resin is used as a plastic material.

Other foam-forming substances may be employed instead of alcohol sulphonates. It is, however, important that the foaming property of the foam-forming substance is not seriously impaired at a pH value of at least 2.

An aqueous organic or inorganic acid may be used as a hardening catalyst. The type of acid is of no great importance, while its acid value is a determining factor. By way of example, a mixture of 2 percent sulphonate solution and one percent concentrated sulphuric acid has proved to be advantageous.

What I claim is:

1. A machine for continuously manufacturing hardenable foam, said machine comprising a coarse foam producing unit and an agitator unit comprising a drum-like container having front and rear ends and end walls closing said ends, said producing unit comprising a casing connected with the front end of the container of the agitator unit, a fine-mesh sieve horizontally located within said casing and separating the interior of said casing into an upper chamber and a lower chamber, a pipe connected with said casing for supplying compressed air to said lower chamber, and a duct connected with said casing for supplying a foam-forming catalyst-containing liquid to said upper chamber, said duct having an opening directed against said sieve for maintaining a layer of said liquid thereon; said upper chamber being in communication with the interior of the agitator unit container to transmit coarse foam thereto, a plurality of horizontal shafts extending through the agitator unit container, a plurality of wire bristle rollers carried upon said shafts and extending from the front end to the rear end of the agitator unit container, a motor drive connected with said shafts for driving at least some of said wire bristle rollers in opposite direction from other wire bristle rollers, a pipe connected with the agitator unit container adjacent the rear end thereof for introducing a liquid polycondensable synthetic resin thereinto, a valve in the last-mentioned pipe, and a foam-removing pipe connected with the agitator unit casing adjacent the rear end thereof.

2. A machine in accordance with claim 1, wherein the ratio of the distance of the resin-introducing pipe from the ends of the agitator unit is substantially 1:3.5.

3. A machine in accordance with claim 1, wherein each of said wire bristle rollers comprises two opposed perforated shells of semi-circular section, and prong-type wires extending radially through the perforations of said shells, each of said wires comprising two long portions projecting out of adjacent perforations, and an intermediate shorter portion attached to the inner wall of the shell, the wires being disposed uniformly upon the outer surface of the shell.

4. A machine in accordance with claim 3, wherein said wires are arranged at axial distances of substantially 10 mm. and have a thickness of 1.2 mm. to 1.5 mm.

5. A machine in accordance with claim 3, wherein said wires are arranged at angular distances of substantially 9 degrees.

6. A machine in accordance with claim 3, comprising discs mounted upon said shells and rotatable therewith, the diameter of said discs being at most equal to that of the wires, said discs being located close to the rear wall of the agitator unit casing.

7. A machine in accordance with claim 6, comprising a transverse baffle plate located within the agitator unit casing in alinement with said discs and having an edge located substantially closely to the periphery of the said discs.

8. A machine for continuously manufacturing hardenable foam, said machine comprising a coarse foam producing unit and an agitator unit comprising a round drum-like container having front and rear ends and end walls closing said ends, said producing unit comprising a casing connected with the front end of the container of the agitator unit, a fine-mesh sieve horizontally located within said casing and separating the interior of said casing into an upper chamber and a lower chamber, a pipe connected with said casing for supplying compressed air to said lower chamber, and a duct connected with said casing for supplying a foam-forming catalyst-containing liquid to said upper chamber, said duct having an opening directed against said sieve for maintaining a layer of said liquid thereon, said upper chamber being in communication with the interior of the agitator unit container to transmit coarse foam thereto, at least four rotary wire bristle rollers located within the agitator unit container and having wire bristles of equal length, the axes of rotation of the wire bristle rollers extending parallel to each other and being located upon four points of a square, said wire bristle rollers being located close to the walls of the agitator unit container, a motor drive connected with said wire bristle rollers for driving at least some of said wire bristle rollers in opposite direction from other wire bristle rollers, a pipe connected with the agitator unit container adjacent the rear end thereof for introducing a liquid polycondensable synthetic resin thereinto, a valve in the last-mentioned pipe, and a foam-removing pipe connected with the agitator unit container adjacent the rear end thereof.

9. A machine for continuously manufacturing hardenable foam, said machine comprising a coarse foam producing unit and an agitator unit comprising a drum-like container having front and rear ends and end walls closing said ends, said producing unit comprising a casing connected with the front end of the container of the agitator unit, a fine-mesh sieve horizontally located within said casing and separating the interior of said casing into an upper chamber and a lower chamber, a pipe connected with said casing for supplying compressed air to said lower chamber, and a duct connected with said casing for supplying a foam-forming catalyst-containing liquid to said upper chamber, said duct having an opening directed against said sieve for maintaining a layer of said liquid thereon, said upper chamber being in communication with the interior of the agitator unit container to transmit coarse foam thereto, four horizontal shafts extending through the agitator unit container, wire bristle rollers carried upon said shafts and extending from the front end to the rear end of the agitator unit, pulleys keyed upon said shafts, a driving pulley, an endless belt extending over said pulleys for driving said bristle rollers in opposite direction from other wire bristle rollers, a pipe connected with the agitator unit container adjacent the rear end thereof for introducing a liquid polycondensable synthetic resin thereinto, a valve in the last-mentioned pipe, and a foam-removing pipe connected with the agitator unit container adjacent the rear end thereof.

References Cited in the file of this patent

UNITED STATES PATENTS

| | | |
|---|---|---|
| 1,592,231 | Stroder | July 13, 1926 |
| 1,937,376 | Schroder et al. | Sept. 19, 1933 |
| 2,245,632 | Winkler | June 17, 1941 |
| 2,307,082 | Grotenhuis | Jan. 5, 1943 |